March 2, 1937.  W. R. HANNA  2,072,331
AERATING AND FERTILIZING MECHANISM
Filed Aug. 28, 1935  2 Sheets-Sheet 1
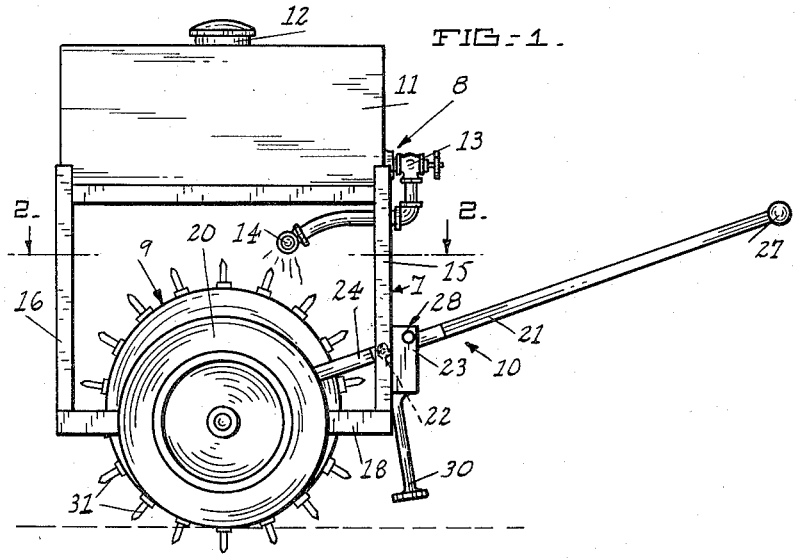
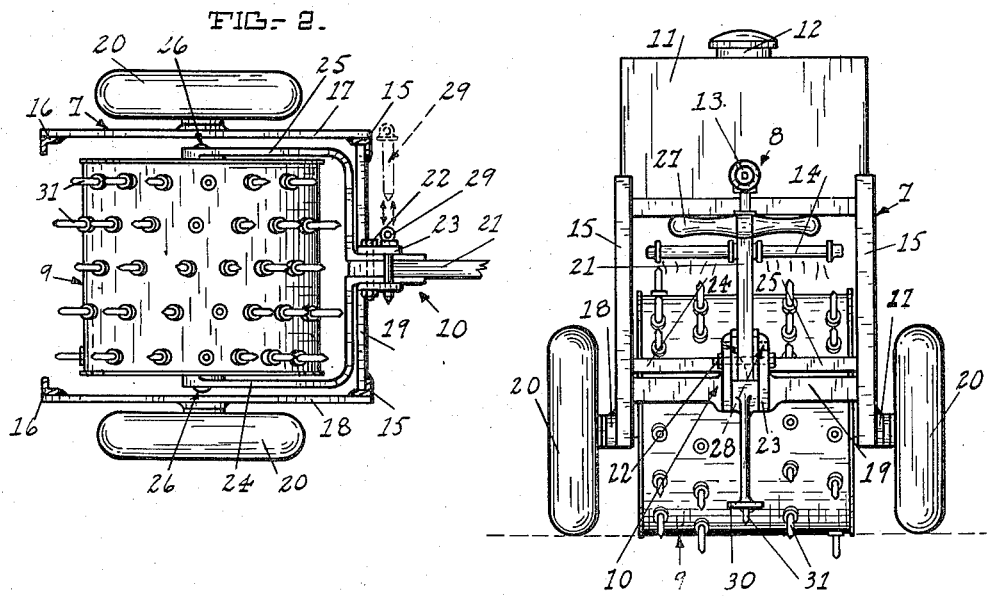
INVENTOR.
Walter Reno Hanna March 2, 1937. W. R. HANNA 2,072,331
AERATING AND FERTILIZING MECHANISM
Filed Aug. 28, 1935 2 Sheets-Sheet 2
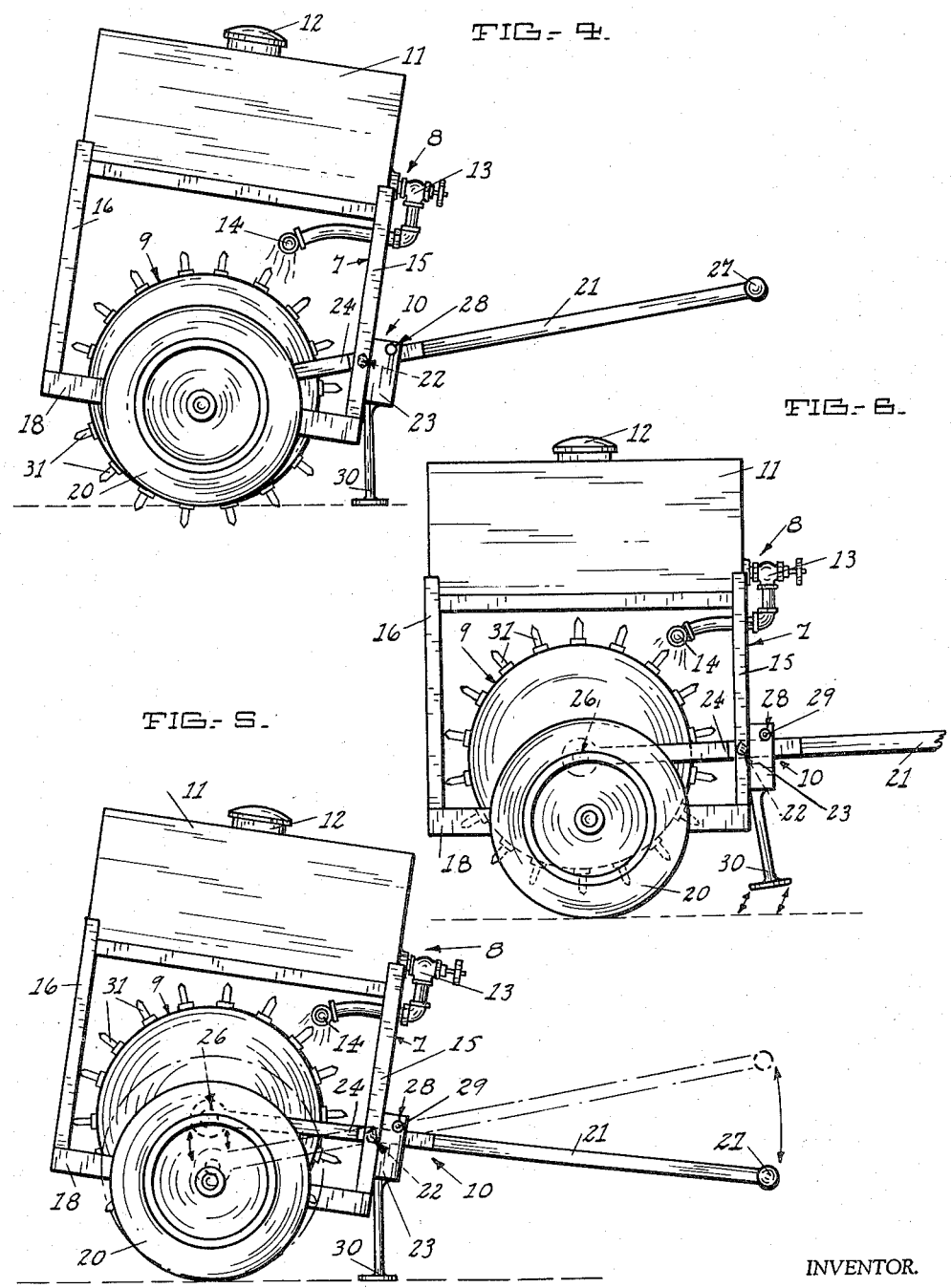
INVENTOR.
Walter Reno Hanna Patented Mar. 2, 1937

2,072,331

UNITED STATES PATENT OFFICE 2,072,331

AERATING AND FERTILIZING MECHANISM

Walter Reno Hanna, Palo Alto, Calif.

Application August 28, 1935, Serial No. 38,180

3 Claims. (Cl. 111—6)

The invention relates to an improved means and method for the care and cultivation of lawns.

The primary object of the invention is the provision of a compact portable device of the character designated that embodies means for causing moisture and air to reach the roots of the grass, and in the same operation to deposit the proper fertilization elements in the soil at a depth at which the roots of the grass may readily assimilate the same.

Another object of the invention is to provide a portable device of this character that is positive in operation, is compact, and that is comparatively simple in construction.

A further object of the invention is to provide a mechanism of this character that may be easily handled when in operation and that may be readily turned about in a short space.

Other objects and advantages of the invention will become apparent with reference to the subjoined specification and the accompanying two sheets of drawings in which:

Figure 1 is a side elevation of the device in its normal operating position;

Figure 2 is a horizontal sectional view taken on the line 2—2 of Figure 1, depicting the method employed in mounting the cylinder within the framework;

Figure 3 is an end elevation of my device in normal operating position;

Figure 4 is a side elevation of the same tilted rearward permitting the fulcrum post to touch the ground;

Figure 5 is a side elevation of my device tilted rearward with the cylinder elevated to idle position; and Figure 6 is a side elevation of my device in horizontal position with the cylinder elevated to permit movement of the device to another location.

Referring now more particularly to the drawings in which the preferred form of the invention is disclosed the machine includes broadly a framework 7, fertilizer container and distributor mechanism 8, spiked cylinder 9, and control handle mechanism 10.

The device comprises specifically the fertilizer containing tank 11, which is provided with a suitable filling pipe 12, mounted centrally on the tank top. The fertilizer tank 11 is also equipped with a discharge and regulating valve 13 mounted in such a position as to permit the operator of the device easy and convenient access thereto when desiring to adjust the flow of fertilizer material from the tank 11.

Connected to the regulating valve 13 is a T shaped sprinkler pipe 14, mounted beneath the tank 11, and over the spiked cylinder 9 in such a manner as to evenly dispense fluid fertilizer upon the spikes and the surface of said cylinder, as clearly shown in Figures 1 and 3.

The framework 7 consists of upright members 15 and 16 securely welded to the cross members 17—18 and 19 to form a rectangular or box-shaped structure which has mounted on the upper portion thereof the tank 11.

Independently mounted to the cross members 17 and 18 are a pair of pneumatic tired wheels 20, that function as the trucks of the device and support the entire structure, as shown.

The control handle mechanism 10 consists of a furcated handle 21 attached to the cross member 19 by means of pivotal bolt 22 mounted in the jaw section 23, of said cross member 19, and enables the operator to readily manipulate and transport the device, that is, from end to end over a given area of lawn or from place to place as the case may be. The handle 21 is provided with the furcations 24 and 25 on its inner end, and they are attached to the axis 26 of the rotatable spiked cylinder 9 positioned within the framework 7, as disclosed in Figure 2. A suitable hand grip 27 is formed on the outer end of the handle 21, which is grasped by the operator to either push, pull, or swing the device about the lawn at will.

The jaw section 23 is also provided with a pair of aligned holes 28, into which is placed an eye bolt 29, whose function will be hereinafter described.

Rigidly attached directly beneath the jaw section 23 is a fulcrum post 30, which post in the normal operating posture of the machine, is elevated from the ground, as shown in Figures 1 and 3, and does not function until the operator of the device applies downward pressure to the handle grip 27, and compels the machine to tilt rearward, as shown in Figure 4.

The cylinder 9 of the device is provided with a plurality of aerating spikes 31 and these spikes penetrate the ground and distribute the fertilizer received from the sprinkler pipe 14 into the ground around the roots of the grass when the cylinder 9 is rotated as the device is pulled or pushed over the lawn by its operator.

It will thus be observed that I have provided an aerating and cultivating device for lawns which is comparatively simple in construction and that aerates the roots of the grass at the time the fertilizer is injected therewith, thus tending to greatly facilitate the growth thereof.

It will also be noted that I have provided a device that may be easily handled at the end of a run and that may be readily reversed for a return run upon the lawn by raising the cylinder from the ground, but first allowing the fulcrum post 30 to contact the earth's surface, as clearly shown in Figure 4. This operation is accomplished by the operator exerting downward pressure on the hand grip 27, of the handle 21, tipping the device rearward until the post 30 has come to rest on the ground. The pressure is still exerted upon the handle and the cylinder 9 is then raised by means of the pivotal bolt 22, and after the cylinder has been raised to the desired height the eye bolt 29 is then inserted in the opening 28, Figures 2 and 5, and the device is then allowed to return to a horizontal position by a slight diminution of the pressure on the handle, as shown in Figure 6. However, sufficient pressure can be maintained on the handle to prevent the return to the ground of the cylinder 9 without inserting the eye bolt 29, and with the cylinder thus elevated it is also possible to swing the device around at will without stopping to lock the cylinder in elevated or idle position.

In addition thereto it will be noted that when liquid fertilizer is allowed to run upon the spikes 31 and the surface of the cylinder 9, said spikes and cylinder surfaces are in addition lubricated. The lubrication of the spikes and the cylinder surface prevents the same from becoming caked or covered with soil, thus keeping up the efficiency of the device by permitting the spikes to sink to their entire depth into the lawn.

I claim and desire to secure by Letters Patent of the United States the following:

1. In a device of the class described, a supporting frame having a pair of wheels arranged thereunder, a cylinder positioned within said frame and capable of rolling upon the ground, a fertilizer tank arranged upon said frame, aerating and fertilizer distributing spikes positioned on said cylinder and fluid distributing means cooperating with said tank to distribute liquid fertilizer to said spikes and cylinder, and lever means associated with the device to raise and lower the cylinder.

2. In a device of the class described, a framework provided with a pair of wheels, a furcated handle pivotally mounted to said framework and having positioned at its furcated end a rotatable spiked cylinder, a fulcrum post co-acting with said handle to provide means for raising said cylinder, and a tank mounted in the framework with fluid conducting and distributing means arranged above said cylinder to disburse fertilizer upon the spikes and cylinder.

3. In a device of the class described, a furcated lever pivotally mounted to a rigid framework, an upright post mounted to said framework from the pivotal connection of the lever and the framework, a spiked rotatable cylinder mounted on the furcated end of said lever and positioned within said framework, and single wheels adjacent two opposite sides of said framework mounted independently of said cylinder and each other.

WALTER RENO HANNA.